United States Patent [19]
Doré

[11] 4,210,002
[45] Jul. 1, 1980

[54] TRANSMISSION JOINT WITH BELLOWS DUST-GUARD

[75] Inventor: Jacques P. Doré, Colombes, France

[73] Assignees: Societe Anonyme Automobiles Citroen; Automobiles Peugeot, both of Paris, France

[21] Appl. No.: 664

[22] Filed: Jan. 3, 1979

[30] Foreign Application Priority Data

Jan. 4, 1978 [FR] France .................... 78 00174

[51] Int. Cl.² ............................................. F16D 3/84
[52] U.S. Cl. ........................................ 64/32 F; 64/21
[58] Field of Search ............... 64/32 F, 21, 32 R, 4

[56] References Cited

U.S. PATENT DOCUMENTS

| | | | |
|---|---|---|---|
| 1,799,661 | 4/1931 | Weiss | 64/32 F |
| 2,227,687 | 1/1941 | Wallner | 64/32 F |
| 2,451,438 | 10/1948 | Hartman | 64/32 F |
| 2,867,100 | 1/1959 | Beecher | 64/32 F |
| 3,362,193 | 1/1968 | Ritsema | 64/21 |
| 3,688,523 | 9/1972 | Schafer | 64/32 F |
| 3,703,089 | 11/1972 | Geisthoff | 64/32 R |
| 3,817,057 | 6/1974 | Orain | 64/32 F |
| 4,094,376 | 6/1978 | Welschof | 64/32 F |

FOREIGN PATENT DOCUMENTS 2257042  1/1974  France .
1150954  5/1969  United Kingdom ............... 64/32 F

*Primary Examiner*—Ira S. Lazarus
*Attorney, Agent, or Firm*—Fleit & Jacobson

[57] ABSTRACT

The invention relates to a transmission joint with bellows-type elastomer dust-guard comprising an inner element rigid with a first shaft and drivingly engaged for rotation with an outer element rigid with a second shaft, the bellows dust-guard comprising end collars adapted to be fastened by clamping the one to the outer element and the other to the first joint shaft. According to the invention, the inner space of the joint and dust-guard assembly is adapted to be connected to the surrounding atmosphere by means of a split resilient ring interposed between the first shaft and the corresponding end collar, and so shaped as to permit the passage of air along this shaft in the clamped collar condition.

5 Claims, 7 Drawing Figures

U.S. Patent        Jul. 1, 1980        4,210,002
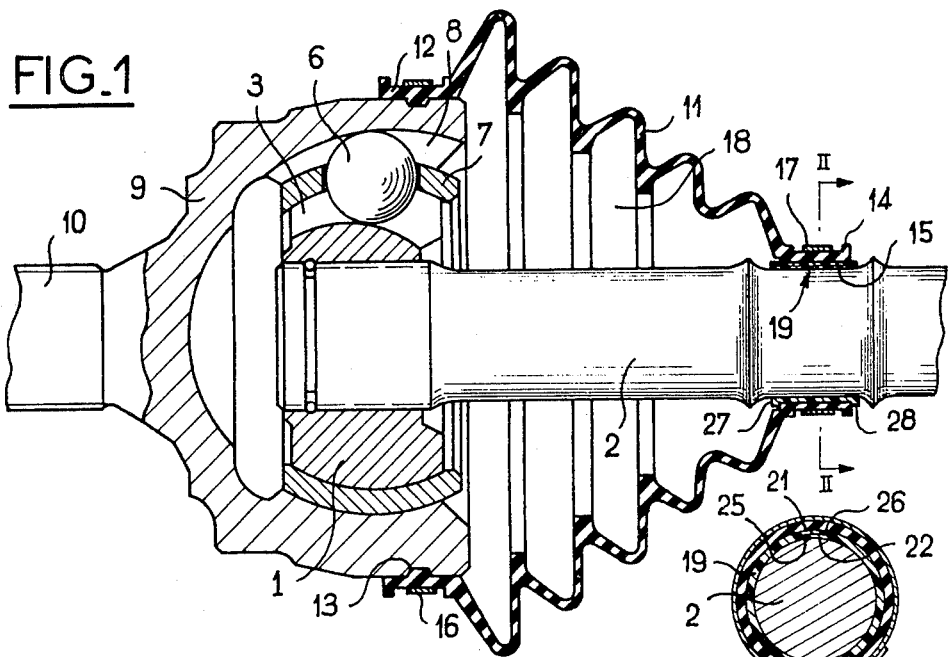
FIG.1
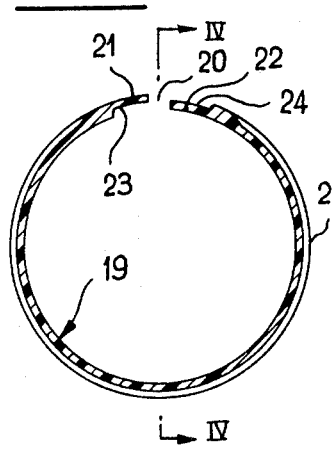
FIG.3
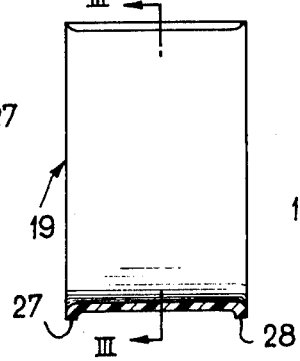
FIG.4
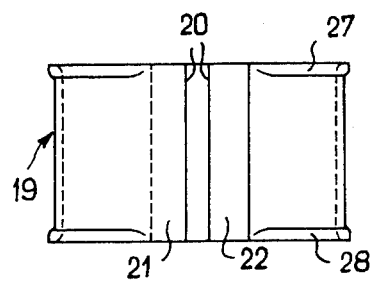
FIG.2
FIG.5
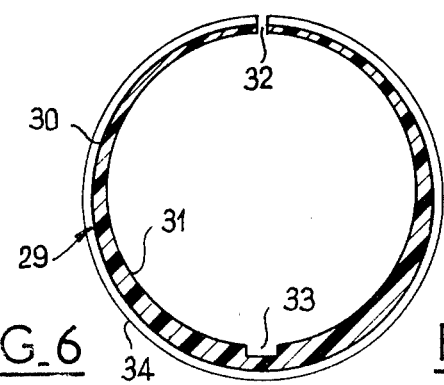
FIG.6
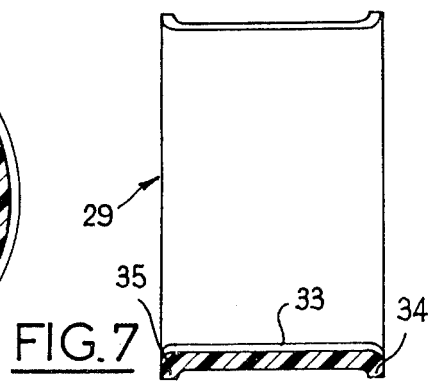
FIG.7

TRANSMISSION JOINT WITH BELLOWS DUST-GUARD

The present invention relates to transmission joints comprising a bellows dust-guard, of the type wherein the joint comprises an inner element rigid with a first shaft and drivingly engaging for rotation an outer element rigid with a second shaft, the bellows-like dust-guard comprising integral end collars adapted to be secured by clamping the one to said outer element and the other to said first joint shaft.

It is known that during the operation of a transmission joint of this general type temperature variations occur which are attended notably by an increment in the inner pressure and also by a bellows distortion, aggravated by the joint grease responsive to the centrifugal pressure, thus developing premature wear and tear of the dust-guard.

Efforts have already been made with a view to avoid this inconvenience by venting the joint and dust-guard assembly to the atmosphere, notably by forming a passage through the first hollow shaft or in the outer element of the joint.

It is the essential object of the present invention to provide a particularly simple device for venting this joint to the atmosphere by modifying only the mounting of the dust-guard, this simple device being definitely free from any interference from the grease present in the joint and dust-guard assembly, and, should the case arise, easily adaptable to any existing joint and dust-guard assembly not provided with venting means.

Basically and to this end the present invention is characterized in that the joint and dust-guard assembly is vented to the atmosphere by means of a resilient split ring interposed between said first shaft and the corresponding end collar, said ring being so shaped as to provide a free passage for the air along said shaft when the collar is clamped to its final condition.

This resilient split ring may be held in its proper position by means of simple end outer shoulders extending on either side of the corresponding collar.

More particularly, the air passage may consist of a gap left at the ring slit, and notably of a specific configuration of this slit, or still of a groove formed in the ring proper, as will be explained presently.

Two typical forms of embodiment of a transmission joint with bellows-type dust-guard will now be described by way of example with reference to the accompanying drawing, in which:

FIG. 1 is an axial section showing a transmission joint and dust-guard assembly of which the inner space is connected to the surrounding atmosphere by means of a split ring;

FIG. 2 is a cross-section taken along the line II—II of FIG. 1;

FIG. 3 is another cross-section taken on a larger scale along the line III—III of FIG. 4;

FIG. 4 is a longitudinal section taken along the line IV—IV of FIG. 3;

FIG. 5 is a plane view from above of the split ring of FIG. 3;

FIG. 6 is a cross-section showing another split ring configuration; and

FIG. 7 is a vertical axial section of the same ring.

The transmission joint illustrated in FIG. 1 is of a type known in the field of transmissions notably for automobiles and comprises an inner element 1 rigid with a first shaft 2 provided at its outer periphery with races such as 3 engaged by balls such as 6.

The balls 6 are retained in a cage 7 and also engaged in races like race 8 formed in the inner surface of a bowl-shaped external element 9 of the joint, which is rigid with the other joint shaft 10.

A bellows-like dust-guard 11 made of suitable elastomer has one end formed into a collar configuration 12 adapted to fit around the outer element 9 for engagement in a groove 13, the other end of the dust-guard 11 fitting on the other shaft 2, i.e., in a groove 15 formed therein, the two collars being fastened in position by means of conventional clamping rings 16 and 17.

In this case the inner space 18 of the joint and dust-guard assembly is vented or connected to the surrounding atmosphere by means of a resilient split ring 19, for example of polypropylene, interposed between the shaft 2 and the fastening collar 14, as illustrated in detail in FIGS. 3 to 5. In its unstressed condition this ring 19 comprises an axial slit 20 and, along this slit, two lips 21 and 22 resulting therefrom, the first lip 21 formed with an internal marginal clearance 23 and the second lip 22 formed with an external marginal clearance 24 adjacent said slit. These clearances are such that when the ring is fitted in position (see FIG. 2) the lips 21, 22 overlap each other only partially, at least on the inner side of the ring, so as to leave between them and the shaft an air passage 25 permitting the communication between the atmosphere and the inner space 18. The gap 26 possibly left externally of the ring by the incomplete overlapping of lips 21 and 22 will be filled substantially completely by the material of collar 14 as a consequence of the tightening thereof by means of the clamping ring 17. It will be seen that external end beads or ribs 27 and 28 formed on the greater part of the periphery of ring 19 project on either side of collar 14, thus reliably holding the ring in proper position in the collar.

Another form of embodiment of slip ring illustrated at 29 in FIGS. 6 and 7 is intended for forming the desired air passage along the shaft in a relatively thicker and stronger area of the ring in comparison with the other portion thereof. This result is obtained by positioning the external circumference 30 of ring 29 eccentrically in relation to the internal circumference 31, and also by positioning the slit 32 in the area of reduced thickness of the ring, thus preventing the dust-guard from being damaged by the ring edge. Besides, the thickest portion of ring 29 comprises an inner groove 33 constituting the desired air passage in the assembled condition of the ring. Also in this case external end shoulders or beads 34, 35 are provided for the same purpose as in the case of shoulders 27, 28 of the preceding form of embodiment.

It is obvious that an air passage thus formed at the fixed end of the dust-guard along the inner shaft of the joint cannot become clogged with grease, since the centrifugal force will constantly tend to force this grease onto the inner space of the joint dust-guard assembly. Moreover, since this air passage is relatively small and formed on a rotating member, any water or foreign particles are safely prevented from penetrating into the transmission joint.

Of course, it will readily occur to those conversant with the art that various modifications and changes may be brought to the forms of embodiment shown and described herein, without departing from the basic principles of the invention as set forth in the appended claims.

What is claimed as new is:

1. A transmission joint with a bellows-type dust-guard of elastomer, the joint comprising an inner element rigid with a first shaft and drivingly engaging for rotation an outer element rigid with a second shaft, said bellows dust-guard comprising end collars fastened by clamping means, the one to said outer element and the other to said first joint shaft, means being provided for connecting the inner space of the joint and dust-guard assembly to the surrounding atmosphere, said connecting means comprising a split resilient ring interposed between said first shaft and the corresponding end collar, and so shaped as to provide a free air passage along said shaft when the collar is clamped in position.

2. A transmission joint with bellows dust-guard according to claim 1, wherein the split ring comprises inner end shoulders extending on either side of the corresponding end collar.

3. A transmission joint with bellows dust-guard according to claim 1, wherein the ring comprises along its slit two lips adapted to overlap each other in the clamped condition of the ring on the shaft, the first lip resulting from an inner marginal clearance and the second lip from an outer marginal clearance adjacent said slit, and such that said lips overlap each other only partially, at least on the inner side of the ring, to provide said air passage.

4. Transmission joint with bellows dust-guard according to claim 1, wherein said air passage consists of a groove formed on the inner surface of the ring.

5. Transmission joint with bellows dust-guard according to claim 4, wherein said groove is formed opposite the ring slit, and that the ring has its outer circumference disposed eccentrically in relation to the inner circumference so that its thickness is greater in the area of said groove than in that of said slit.

* * * * *